UNITED STATES PATENT OFFICE.

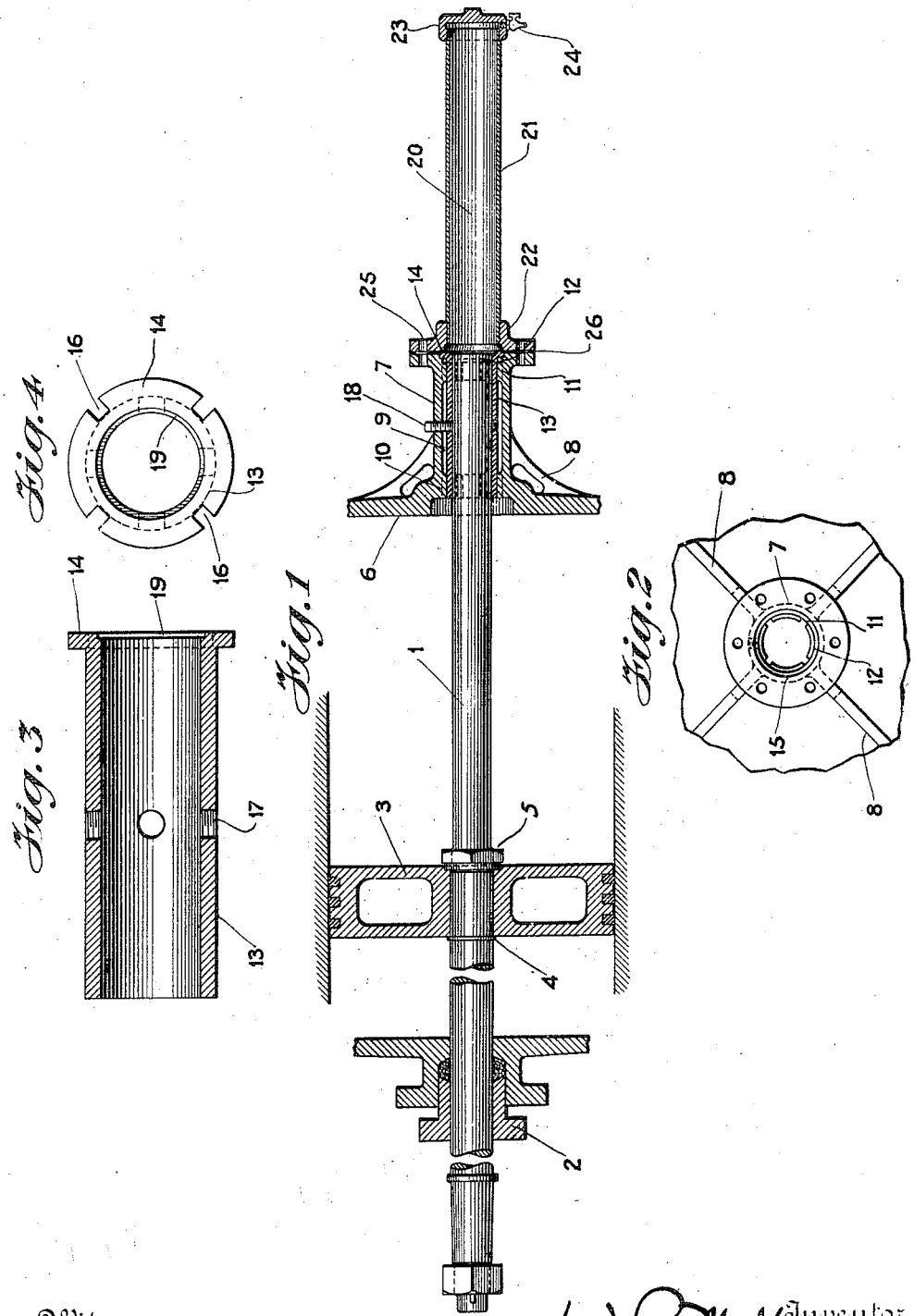

WILLIAM R. McKEEN, JR., OF OMAHA, NEBRASKA.

PISTON-ROD.

982,972.  Specification of Letters Patent.  Patented Jan. 31, 1911.

Application filed October 2, 1905. Serial No. 280,921.

*To all whom it may concern:*

Be it known that I, WILLIAM R. McKEEN, Jr., residing at Omaha, in the county of Douglas and State of Nebraska, have invented certain new and useful Improvements in Extended Piston-Rods, of which the following is a full, clear, and exact description, such as will enable others skilled in the art to which it appertains to make and use the same.

This invention relates to engines and, more particularly, to engines having extended piston-rods.

One of the objects thereof is to provide simple and efficient means adapted to aid in the support of a piston-head and hold in alinement the rod thereof.

Another object is to provide means of the above type which shall be readily maintained in efficient working condition.

Another object is to provide means of the first-mentioned type, all parts of which shall be readily accessible.

Other objects will be in part obvious and in part pointed out hereinafter.

The invention accordingly consists in the features of construction, combinations of elements and arrangement of parts which will be exemplified in the apparatus hereinafter described and the scope of the application of which will be indicated in the following claims.

In the accompanying drawings, wherein is shown one of various possible embodiments of my invention,—Figure 1 is a longitudinal section of the same; Fig. 2 is an end elevation of certain parts thereof; Fig. 3 is a sectional view of a bushing; Fig. 4 is an end view of the same.

Similar reference characters refer to similar parts throughout the several views of the drawings.

Preliminary to a detailed description of this embodiment of my invention, it may here be noted that in the case of large cylinders, as in the low-pressure cylinders of multiple expansion engines, I have found that there is a tendency, when the rod terminates with the piston-head, to bring on the packing rings a considerable weight and to expose these parts, together with the cylinder walls, to considerable friction, resulting in the cutting and rapid wearing away of these parts and, in the case of large piston-heads, often causing a tendency of the head to cramp or wedge within the cylinder. I have found that if it be attempted to remedy the above defects by means of an extended piston-rod, it is highly desirable in the case of a locomotive engine, in which relation this invention is peculiarly adapted for embodiment, that means should be provided whereby the entire mechanism is compact and self-contained. Also, on account of the wear upon the supporting parts, I have found it to be important, for a nice alinement of the piston-rod, that these parts be readily maintained in a highly efficient condition. The above and other advantages are attained in constructions of the nature of that hereinafter described.

Referring now to the accompanying drawings, there is shown a piston-rod 1 passing through a stuffing box 2 and provided with a piston-head 3 held thereon against the shoulder 4 as by means of nut 5. As these parts are of well known construction, and form, in themselves, no part of the present invention, a detailed description thereof is unnecessary.

Piston-rod 1 extends through the cylinder-head 6, the latter part being provided with a bearing 7 stiffened by suitable radial ribs 8, as shown in the drawings. The bearing 7 is recessed, as shown at 9, and provided with longitudinal grooves 10 and 11, respectively extending from this recessed portion toward and away from the cylinder and leading respectively into the cylinder and into an annular groove 12 cut within the outer end.

Within bearing 7 of the cylinder-head is fitted a bushing 13, best shown in Figs. 3 and 4 of the drawings. This bushing is provided with a flared lip or flange 14 adapted to be seated within an annular recess 15 formed in the cylinder-head, and is provided with slots 16 for a purpose hereinafter to be described. Bored through bushing 13 at regular intervals and preferably four in number are the openings 17 tapped to receive a threaded plug 18, which passes through the bearing 7. It will thus be seen that, upon the bushing 13 being rotated, as by a spanner engaging the slots 16, the portion thereof upon which the weight of the rod with its associated parts falls may be varied at will and the bushing locked in position, as by the plug 18. The slots 16, moreover, are so disposed as, upon the bushing being locked by the plug 18, to register with the groove 11 and thus provide a free passage for the steam to and from the cylinder, as hereinafter described.

About the outer end of the bushing 13 is turned a groove 19, which is adapted to serve as a tell-tale indicating the depth of wear of the rod 1. This groove, which extends preferably to a depth corresponding to the limit of permissible wear of the rod upon the bushing, is readily inspected, and, upon the rod wearing down to the lower surface of the groove, the plug 18 is withdrawn and the bushing turned and relocked by the plug, as above described.

Upon the outer end of the extended portion of the cylinder-head or bearing is bolted what may be termed a "casing" 20, which comprises a heavy tube 21 provided at its inner surface with a collar 22 and terminating at its outer end in a cap 23 having a suitable drainage cock 24. The collar 22 is rigidly bolted, as at 25, to the flanged outer end of the head, a copper gasket 26 being inserted between these parts. The tube 21 is thus held in alinement with the piston-rod and provides a suitable housing therefor, upon the piston traveling to the head end of the cylinder. Collar 22, as will be seen from the drawings, takes against the flange 14 of the bushing 13 and positively locks the same against outward movement with the parts in assembled condition.

The operation of the above described embodiment of my invention is substantially as follows: The bushing 13 is inserted within bearing 7, and the plug 18 being driven home within one of the openings 17, the casing or housing 20 is bolted in position against the flange 14. The engine is then in running condition, and the weight of the piston-head and associated parts is supported, as well as the rod 1 held in alinement, by reason of the bearing of the extended portion thereof within the bushing 13. As the housing 20 is steam-tight, no packing is needed in this bearing, and additional friction and complication of the mechanism is thus done away with. The steam from the cylinder, moreover, has a free passage to and from the casing provided through the grooves 10 and 11 and slots 16, as above described, and hence there is no resistance to the movement of the extended end of the piston-rod within the casing. It will also be noted that the slots permit to some extent the drainage of water of condensation from the housing 20 into the cylinder. The cock 24 is used in a well known manner to drain any water of condensation which may accumulate in casing 20. When it is desired to inspect the several parts, as for determining the amount of wear of the bushing 13, the casing is removed, it being necessary merely to withdraw the bolts 25, whereupon the outer end of the bushing is fully exposed, and, by an inspection of the limit groove 19, the condition of the bushing may be determined at a glance. If the wear has reached the limit permissible, it is necessary merely to rotate the bushing as above described in such manner as to bring a new portion thereof into position under the piston-rod. If, however, the entire bushing has worn down, the same may be readily withdrawn and a new bushing inserted and locked in position, upon casing 20 being replaced.

It will be seen that I have provided simple, inexpensive and efficient means whereby a piston-rod, with the parts mounted thereon, is supported at the head end of the cylinder and the packing rings and cylinder walls are relieved of the weight which would otherwise be brought to bear thereon. The piston-rod, moreover, is held in exact alinement, and any tendency to cramp the piston head or cut the parts through which either this member or the piston-head travels is done away with. The parts, moreover, whereby these desirable results are accomplished are readily inspected and easily adjusted or renewed. These parts, moreover, are positively locked in assembled condition and yet may be removed with a minimum of effort. The entire device, it will be seen, is well adapted to accomplish the several objects of my invention and embodies, among others, the several advantageous features herein referred to.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:—

1. In engine construction, in combination, a cylinder-head, a piston-rod passing through said head, a bushing interposed between said head and said rod and provided with an outwardly-extending lip resting against said head, and a casing into which said rod is adapted to travel secured directly to said head and engaging said lip and locking the same against said head, said lip being countersunk within said head.

2. In engine construction, in combination, a cylinder-head, a piston-rod passing through said head, a casing secured to said head and adapted to receive said piston rod and a bushing interposed between said head and said rod, the exposed end of said bushing being recessed to an equal depth at a plurality of points about its inner circumference to indicate the depth of wear of said rod thereon.

3. In engine construction, in combination, a cylinder-head, a piston-rod passing through said head, a bushing interposed between said rod and said head, a recess cut in the outer end of said bushing adapted to indicate the depth of wear of said rod thereon and a removable casing secured to said head and adapted to receive said piston-rod, said casing being adapted upon removal to expose the recessed end of said bushing.

4. In engine construction, in combination, a cylinder, an integral piston rod passing through both heads of said cylinder, a bushing interposed between said rod and one of said heads, said bushing being provided with an annular groove about its outer end, the outer wall of said groove being concentric with the inner surface of said bushing, and a closed casing secured to said head and adapted to receive said piston rod, said head being provided with a passage leading from said casing into said cylinder whereby the fluid displaced by said piston rod may pass into said cylinder.

5. In engine construction, in combination, a cylinder-head, a piston-rod passing through said head, a rotatable bushing interposed between said head and said rod and adapted to be drawn outwardly from said head, means adapted to lock said bushing against longitudinal movement, and independent means adapted to lock said bushing in a plurality of predetermined positions against rotary movement.

6. In engine construction, in combination, a cylinder-head, a piston-rod passing through said head, a bushing interposed between said rod and said head and provided with an outwardly-projecting part engaging said head and countersunk therein and with means adapted to indicate the depth of wear of said rod thereon, and means adapted to lock said outwardly-projecting part against said head.

7. In engine construction, in combination, a cylinder-head, a piston-rod passing through said head, a bushing interposed between said head and said rod, a casing secured to said head into which said rod is adapted to travel, and grooves within said head about said bushing adapted to permit the passage of steam from the cylinder into and out of said casing.

8. In engine construction, in combination, a cylinder-head, a piston-rod passing through said head, a bushing interposed between said head and said rod and provided with an outwardly-extending lip resting against said head and having slots cut therein, a casing into which said rod is adapted to travel secured to said head and engaging said lip and locking said bushing in operative position, and grooves within said cylinder-head about said bushing adapted to coact with said slots and permit the passage of steam from the cylinder into and out of said casing.

9. In engine construction, in combination, a cylinder head, a piston rod passing through said head, a bushing interposed between said head and said rod, and a closed casing secured to said head into which said rod is adapted to travel, said bushing being cut away to permit the passage of fluid from the cylinder into and out of said casing.

10. In engine construction, in combination, a cylinder, an integral piston rod passing through both heads of said cylinder, and a substantially horizontal closed casing secured to one of said heads and adapted to receive said rod, said head being provided with a passage adapted to permit the passage of fluid from the cylinder into and out of said casing.

11. In engine construction, in combination, a cylinder, an integral piston rod passing through both heads of said cylinder, and a closed casing secured to one of said heads in a substantially horizontal position and adapted to receive said rod, said head being provided with a passage leading from the lower portion of said casing to the interior of said cylinder whereby steam may pass to or from said casing and said casing may drain into said cylinder.

In testimony whereof I affix my signature, in the presence of two witnesses.

WILLIAM R. McKEEN, Jr.

Witnesses:
   WILLIAM S. McCUNE,
   GEO. THOMPSON.